United States Patent Office 3,278,456
Patented Oct. 11, 1966

3,278,456
DIEPOXIDE COMPOSITIONS
Paul S. Starcher, Charleston, and Samuel W. Tinsley, Charles W. McGary, Jr., and Charles T. Patrick, Jr., South Charleston, W. Va., assignors to Union Carbide Corporation, a corporation of New York
No Drawing. Filed Dec. 27, 1960, Ser. No. 78,344
13 Claims. (Cl. 260—2)

This invention relates to novel diepoxide compositions. In one aspect, this invention relates to a method for preparing novel diepoxides. In various other aspects, this invention relates to curable, polymerizable compositions comprising a novel diepoxide and an active organic hardener, to the thermosetting intermediate reaction products, and to the cured, polymerized products resulting therefrom.

The polymerizable compositions of the invention can be readily handled in resin-forming operations such as coating, laminating, bonding, molding, casting, potting, and the like. These polymerizable compositions are capable of accepting solid materials, such as fillers and pigments, for providing various effects in physical properties and coloration. With or without such added solid materials, the polymerizable compositions can be made to fill small intricacies of molds without the necessity of applying high pressures or heating to high temperatures, although such measures can be employed, if desired. The polymerizable compositions also can be easily spread, brushed, or sprayed by many techniques available in the paint, lacquer and varnish industries for making coatings and finishes. Little, if any, shrinkage occurs in curing to the resin. The polymerizable compositions are capable of being accurately shaped by molds having intricate molding surfaces and fully cured to resins carrying exact details of such molding surfaces. They can be also advantageously employed in the potting of such fragile articles as electronic components.

The curable, polymerizable compositions of the invention also can be partially reacted at elevated temperatures to form viscous thermosetting liquids or thermosetting solids. The resulting thermosetting intermediate reaction products can be dissolved in an inert normally-liquid organic medium and applied as heat-curable coatings. To aid solution, the thermosetting solid products can be powdered or granulated, if desired. The thermosetting solids also can be used as molding powder compositions which can be converted to fully cured solid products by the application of heat and/or pressure. Numerous other uses, applications, and unexpected advantages and results will become apparent upon a consideration of the various embodiments of the invention which are discussed hereinafter.

Accordingly, one or more of the following objects will be achieved by the practice of the invention.

It is an object of the invention to prepare novel diepoxides. A further object of the invention is to prepare homopolymerized products of the novel diepoxides. It is a further object of the invention to prepare novel curable, partially cured, and cured compositions comprising a diepoxide and an active organic hardener. It is another object of the invention to prepare novel curable, polymerizable compositions comprising a diepoxide, an active organic hardener, and a modifying amount of a different active organic compound to thereby impart special and desirable characteristics and properties to ultimately, fully cured compositions. It is a further object of the invention to prepare novel curable compositions and partially cured compositions (thermosetting intermediate reaction products) comprising a diepoxide and an active organic hardener which compositions, when dissolved in an inert normally-liquid organic medium, are useful in the fields of coatings, laminates, adhesives, and the like. A still further object of the invention is to prepare novel thermosetting intermediate reaction solid products resulting from the partial reaction of a composition comprising a diepoxide and an active organic hardener, which products are useful as molding powder compositions. A yet further object of the invention is to provide novel curable and fully cured compositions comprising a diepoxide, a polycarboxylic acid anhydride, a polyol, and an ethylenically unsaturated organic compound. Another object of the invention is to provide novel and useful high molecular weight polymeric varnish compositions which result from the homopolymerization of the hydroxy- and epoxy-containing product prepared by the reaction of a diepoxide and an aliphatic hydrocarbonmonocarboxylic acid. It is also an object of the invention to prepare novel and useful high molecular weight polymeric varnish compositions which result from the esterification of fusible, soluble polymeric polyhydric alcohols with organic fatty acids, said polymeric polyhydric alcohols being prepared by the reaction of a diepoxide and a polyol. A further object of the invention is to provide novel, useful curable and cured compositions comprising a diepoxide, a polyepoxide and an active organic hardener. Numerous other objects will become apparent to those skilled in the art from a consideration of the disclosure.

A broad aspect of the invention pertains to the novel and useful epoxides characterized by the following formula:

(1)

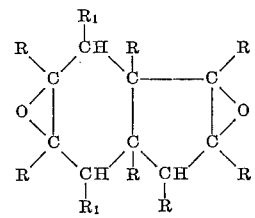

wherein R represents hydrogen or an alkyl radical and wherein $R_1$ represents (a) hydrogen, (b) an alkyl radical, (c) a halogen radical, (d) an alkoxy radical, (e) alkanoyloxy radical, (f) an alkoxycarbonyl radical, or (g) a cyano radical.

It should be noted at this time that the expression "alkyl" as used herein including the appended claims, refers to a monovalent saturated aliphatic hydrocarbon radical which contains from 1 to 6 carbon atoms. Moreover, in the expressions "alkoxy radical," "alkanoyloxy radical," and "alkoxycarbonyl radical" as used herein, the alkyl portions of said radicals are defined in the same manner as the term "alkyl" above.

With reference to Formula I supra, illustrative $R_1$ variables include, among others, hydrogen, methyl, ethyl, n-propyl, isopropyl, n-butyl, tertiary-butyl, n-pentyl, n-hexyl, chloro, bromo, fluoro, methoxy, ethoxy, n-propoxy, isopropoxy, n-butoxy, tertiary-butoxy, n-pentoxy, n-hexoxy, acetoxy, n-propanoyloxy, isopropanoyloxy, n-butanoyloxy, n-pentanoyloxy, n-hexanoyloxy, methoxycarbonyl, ethoxycarbonyl, propoxycarbonyl, isopropoxycarbonyl, butoxycarbonyl, pentoxycarbonyl, hexoxycarbonyl and the like.

Illustrative subclasses of the diepoxides of the invention include, for example, 4,10-dioxatetracyclo[5.4.0.0$^{3,5}$.0$^{9,11}$]alkyl substituted-undecane,
4,10-dioxatetracyclo[5.4.0.0$^{3,5}$.0$^{9,11}$]halogen substituted-undecane,
4,10-dioxatetracyclo[5.4.0.0$^{3,5}$.0$^{9,11}$]alkoxyundecane,
4,10-dioxatetracyclo[5.4.0.0$^{3,5}$.0$^{9,11}$]alkanoyloxy-undecane, 4,10-dioxatetracyclo[5.4.0.0$^{3,5}$.0$^{9,11}$]alkoxycarbonyl-
undecane,
and the like.

Specific examples of the diepoxides of the invention include, for instance, 4,10-dioxatetracyclo[5.4.0.0$^{3,5}$.0$^{9,11}$]undecane;
4,10-dioxatetracyclo[5.4.0.0$^{3,5}$.0$^{9,11}$]-9-methylundecane;
4,10-dioxatetracyclo[5.4.0.0$^{3,5}$.0$^{9,11}$]-11 methylundecane;
4,10-dioxatetracyclo[5.4.0.0$^{3,5}$.0$^{9,11}$]-3,6-dimethyl-
undecane;
4,10-dioxatetracyclo[5.4.0.0$^{3,5}$.0$^{9,11}$]-2,5-dimethyl-
undecane;
4,10-dioxatetracyclo[5.4.0.0$^{3,5}$.0$^{9,11}$]-2,5,9-trimethyl-
undecane;
4,10-dioxatetracyclo[5.4.0.0$^{3,5}$.0$^{9,11}$]-2-ethylundecane;
4,10-dioxatetracyclo[5.4.0.0$^{3,5}$.0$^{9,11}$]-3-hexylundecane;
4,10-dioxatetracyclo[5.4.0.0$^{3,5}$.0$^{9,11}$]-6-hexlundecane;
4,10-dioxatetracyclo[5.4.0.0$^{3,5}$.0$^{9,11}$]-2-chloroundecane;
4,10-dioxatetracyclo[5.4.0.0$^{3,5}$.0$^{9,11}$]-6-chloroundecane;
4,10-dioxatetracyclo[5.4.0.0$^{3,5}$.0$^{9,11}$]-2,6-dichloro-
undecane;
4,10-dioxatetracyclo[5.4.0.0$^{3,5}$.0$^{9,11}$]-2-bromoundecane;
4,10-dioxatetracyclo[5.4.0.0$^{3,5}$.0$^{9,11}$]-2-methoxyundecane;
4,10-dioxatetracyclo[5.4.0.0$^{3,5}$.0$^{9,11}$]-6-ethoxyundecane;
4,10-dioxatetracyclo[5.4.0.0$^{3,5}$.0$^{9,11}$]-2-hexoxyundecane;
4,10-dioxatetracyclo[5.4.0.0$^{3,5}$.0$^{9,11}$]-9-methyl-2-
butoxyundecane;
4,10-dioxatetracyclo[5.4.0.0$^{3,5}$.0$^{9,11}$]-2-acetoxyundecane;
4,10-dioxatetracyclo[5.4.0.0$^{3,5}$.0$^{9,11}$]-6-acetoxyundecane;
4,10-dioxatetracyclo[5.4.0.0$^{3,5}$.0$^{9,11}$]-9-methyl-6-
propanoyloxyundecane;
4,10-dioxatetracyclo[5.4.0.0$^{3,5}$.0$^{9,11}$]-2-hexanoyloxy-
undecane;
4,10-dioxatetracyclo[5.4.0.0$^{3,5}$.0$^{9,11}$]-6-methoxy-
carbonylundecane;
4,10-dioxatetracyclo[5.4.0.0$^{3,5}$.0$^{9,11}$]-2-propoxycar-
bonylundecane;
4,10-dioxatetracyclo[5.4.0.0$^{3,5}$.0$^{9,11}$]-2-hexoxycarbonyl-
undecane;
4,10-dioxatetracyclo[5.4.0.0$^{3,5}$.0$^{9,11}$]-2-cyanoundecane;
4,10-dioxatetracyclo[5.4.0.0$^{3,5}$.0$^{9,11}$]-6-cyanoundecane;
4,10-dioxatetracyclo[5.4.0.0$^{3,5}$.0$^{9,11}$]-2,6-dicyano-
undecane;
and the like.

The novel diepoxides employed as a component in the novel compositions of the invention can be prepared by epoxidation of the corresponding diolefin with organic peracids. For example, alkyl substituted-bicyclo[4.3.0]nona-3,8-diene, alkoxy substituted-bicyclo[4.3.0]nona-3,8-diene, alkanoyloxy substituted bicyclo[4.3.0]nona-3,8-diene and the like, can be reacted with a solution of peracid, e.g., perbenzoic acid, perpropionic acid, peracetic acid and the like, in an inert normally-liquid organic medium such as ethyl acetate, acetone, butyl acetate and the like, at a temperature in the range from about 0° C. to about 100° C., preferably from about 25° C. to about 80° C., for a period of time sufficient to introduce oxirane oxygen at the site of all of the carbon to carbon double bonds of the diolefin reagent. The quantity of peracid consumed during the epoxidation reaction can be readily determined during the course of the reaction by well-known procedures. A residence time of from about several minutes to about several hours, e.g., 30 minutes to 18 hours, is satisfactory in most instances. Theoretically, to effect substantially complete epoxidation of the diolefin reagent, at least a stoichiometric quantity of peracetic acid per carbon to carbon double bond of said diolefin reagent should be employed. The inert normally-liquid organic vehicle and acetic by-product can be recovered from the reaction product mixture, for example, by distillation under reduced pressure. If desired, the residue product can be subjected to fractional distillation, crystallization, and the like to obtain the diepoxide product in high purity.

The diolefins which are used in preparation of the novel compounds of this invention can be readily prepared by the well-known Diels-Alder reaction of butadienes or a substituted butadiene with cyclopentadiene of a substituted cyclopentadiene. The resulting product, a bicyclo[4.3.0]nona-3,8-diene, can be produced having various substituents such as alkyl, halo, alkanoyloxy and the like, attached to the bicyclo[4.3.0]nona-3,8-diene compound.

Illustrative of the butadiene and substituted butadienes which can be used in the preparation of the diolefin starting material of the invention include, for instance, butadiene,
1,3-pentadiene,
1,3-hexadiene,
1,3-heptadiene,
1,3-octadiene,
1,3-nonadiene,
2,4-hexadiene,
2,4-heptadiene,
2,4-octadiene,
2,4-nonadiene,
2-methyl-1,3-butadiene,
2-ethyl-1,3-butadiene,
2,3-dimethylbutadiene,
2-methyl-1,3-pentadiene,
3-methyl-1,3-pentadiene,
2-ethyl-1,3-hexadiene,
2,3-dimethyl-1,3-pentadiene,
2,3-dimethyl-1,3-hexadiene,
2,3-dimethyl-1,3-heptadiene,
2,3-dimethyl-1,3-nonadiene,
1-chloro-1,3-butadiene,
1-chloro-3-methyl-1,3-pentadiene,
1-chloro-1,3-hexadiene,
1-chloro-1,3-nonadiene,
1-bromo-1,3-decadiene,
1-methoxy-1,3-butadiene,
1-ethoxy-1,3-butadiene,
1-hexoxy-1,3-butadiene,
1-hexoxy-2-ethyl-1,3-butadiene,
1-acetoxy-1,3-pentadiene,
1-propanoyloxy-1,3-butadiene,
1-hexanoyloxy-1,3-butadiene,
1-butanoyloxy-2-methyl-1,3-butadiene,
methyl sorbate,
ethyl sorbate,
propyl sorbate,
hexyl sorbate,
methyl 3,4-pentadienoate,
hexyl 2,4-pentadienoate,
1-cyano-1,3-butadiene, and the like. Illustrative of the cyclopentadiene and alkyl substituted-cyclopentadienes include, for instance, cyclopentadiene, 2-methylcyclopentadiene, 3-methylcyclopentadiene, 2,3-dimethylcyclopentadiene, 2-ethylcyclopentadiene, 3-hexylcyclopentadiene and the like. One method of obtaining cyclopentadiene and/or alkyl substituted-cyclopentadiene is by heating dicyclopentadiene or alkyl substituted-dicyclopentadiene above 170° C. wherein the dicyclopentadienes break down into the corresponding cyclopentadienes.

In various aspects, the invention further is directed to novel curable, partially cured, and cured compositions comprising a novel diepoxide characterized by Formula I, supra, and an active organic hardener. The active organic hardeners illustrated hereinafter are employed in a curing amount, that is, an amount which is sufficient to cause the curable system comprising diepoxide to become a thermosetting or thermoset resin in accordance with the teachings of the instant specification. Representative active organic hardeners include polycarboxylic acids, polycarboxy polyesters, polycarboxylic acid anhydrides, polyols, i.e., polyhydric phenols and polyhydric alcohols, polyfunctional amines, polythiols, polyisocyanates, polyisothiocyanates, polyacyl halides, and the like. The novel compositions can contain one diepoxide or a mixture of diepoxides as well as one active organic hardener or a mixture of active organic hardeners.

The curable compositions of the invention can be prepared by mixing the diepoxide(s) with the active organic hardener(s), preferably under agitation so as to obtain a homogeneous mixture. The order of addition of the components does not appear to be critical. When a solid or highly viscous diepoxide or active organic hardener is employed, heating is advantageous in facilitating the formation of a solution. In preparing homogeneous mixtures, it is advantageous to employ a temperature as high as the melting point of the highest melting component contained in the curable mixture. In any event the application of heat should not be prolonged to the extent that appreciable curing takes place.

The curable compositions of the invention can be partially cured or fully cured by maintaining the temperature in the range of from about 10° C., and lower, to about 250° C., and higher, and preferably from about 25° to about 200° C. A higher curing temperature generally will provide a thermosetting or thermoset resin in less time than a lower curing temperature. One preferable method is to heat the curable compositions to a temperature within the range from about 50° C. to 150° C. to first partially cure the composition. A temperature from about 100° C. to 200° C. then can be used to complete the cure. However, any one or combination of two or more temperatures within the specified range of 10° C. to 250° C. can be employed, if desired, to effect the full cure. For casting purposes the preferred minimum temperature of the normally-solid curable compositions is that at which said compositions form a uniform melt, whereas for coatings and the preparation of laminates, the use of solvents will allow the use of lower temperature.

The time for effecting the partial cure or complete cure will be governed to an extent, on several factors such as the particular diepoxide(s) employed, the particular active organic hardener(s) employed, the proportions of diepoxide and active organic hardener, the inclusion of an active organic hardener modifier, the inclusion of a catalyst, the concentration of the catalyst and/or modifier, the temperature for effecting the cure, and other considerations. In general, the time for effecting the complete cure can vary from several minutes to several days, e.g., from 10 minutes to one week, depending upon the correlation of such factors as illustrated above.

If desired, catalysts can be incorporated into the curable compositions of the invention to increase the cure rate and/or reduce the gelation period. An advantageous method is to add the catalyst to the curable mixture at substantially the lowest temperature required to form an essentially liquid curable mixture. It is generally suitable to add the catalyst to the curable composition which is maintained at a temperature in the range of from about 10° to 100° C. Agitation of the curable composition prior to, during and after the incorporation of the catalyst is desirable to ensure a homogeneous mixture. If desired, higher temperatures may be employed with, however, the possibility of inducing premature and localized curing around catalyst particles prior to the formation of a homogeneous, curable mixture. In most cases it may be desirable to obtain a homogeneous mixture before bringing about any substantial degree of curing and in such instances low mixing temperatures of the order specified above can be employed. Catalyst concentrations and curing temperatures are believed to affect the curing rate, the higher concentrations and temperatures promoting faster cures than the lower ones. Catalyst concentrations can be varied over a broad range and can be selected on the basis of the rate of cure desired and the curing temperature to be used. It has been found that catalyst concentrations from about 0.005 or lower, to 15 weight percent or higher, preferably from about 0.01 to 5 weight percent, based on the weight of the diepoxide(s) component, are advantageous in forming valuable thermoset resins from the curable compositions.

Basic and acidic catalysts which can be employed in the curable compositions include, for example, the metal halide Lewis acids, e.g., boron trifluoride, aluminum chloride, zinc chloride, stannic chloride, ferric chloride, boron trifluoride-amine complex, boron trifluoride-piperidine complex, boron trifluoride-1,6-hexanediamine complex, boron trifluoride-monoethylamine complex, boron trifluoride-ether complex, boron trifluoride-dimethyl ether complex, boron trifluoride-diethyl ether complex, boron trifluoride-dipropyl ether complex and the like; the strong mineral acids, e.g., sulfuric acid, phosphoric acid, polyphosphoric acid, perchloric acid, and the like; the saturated aliphatic hydrocarbon sulfonic acids and the aromatic hydrocarbon sulfonic acids, e.g., ethylsulfonic acid, propylsulfonic acid, benzenesulfonic acid, toluenesulfonic acid, naphthalenesulfonic acid, lower alkyl substituted-benzenesulfonic acid, and the like; the alkali metal hydroxides, e.g., sodium hydroxide, potassium hydroxide, and the like; the amines, e.g., alpha-methylbenzyldimethylamine, dimethylethylamine, triethylamine, tripropylamine, trimethylammonium hydroxide, and the like. When the catalyst and curable compositions are immiscible, the catalyst can be added as a solution in an inert normally-liquid organic medium. Typical media for the catalysts include the organic ethers, e.g., diethyl ether, dipropyl ether, and the like; the organic esters, e.g., methyl acetate, ethyl acetate, methyl propionate, ethyl propionate, and the like; the organic ketones, e.g., acetone, cyclohexanone, methylcyclohexanone, and the like.

In another preferred embodiment the invention is directed to novel curable, partially cured, and cured compositions comprising diepoxide and polycarboxylic acid in such relative amounts as provide from about 0.1 to about 2.0 carboxyl groups, i.e., —COOH groups, of said polycarboxylic acid per epoxy group, i.e.,

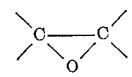

group, of said diepoxide, and preferably from about 0.3 to about 1.2 carboxyl groups per epoxy group.

Representative polycarboxylic acids which can be employed include, for example, oxalic acid,
malonic acid,
succinic acid,
glutaric acid,
adipic acid,
pimelic acid,
suberic acid,
azelaic acid,
sebacic acid,
alkylsuccinic acids,
alkenylsuccinic acids,
ethylbutenylsuccinic acid,
maleic acid,
fumaric acid,
itaconic acid,
citraconic acid,
mesaconic acid,
glutaconic acid,
ethylidenemalonic acid,
isopropylidenemalonic acid,
allylmalonic acid,
muconic acid,
alpha-hydromuconic acid,
beta-hydromuconic acid,
diglycolic acid,
dilactic acid,
thiodiglycolic acid,
4-amyl-2,5-heptadienedioic acid, 3-hexynedioic acid,
1,2-cyclohexanedicarboxylic acid,
1,4-cyclohexanedicarboxylic acid,
2-carboxy-2-methylcyclohexaneacetic acid,
phthalic acid,
isophthalic acid,
terephthalic acid,
tetrahydrophthalic acid,
tetrachlorophthalic acid,
1,8-naphthalenedicarboxylic acid,
3-carboxycinnamic acid,
1,2-naphthalenedicarboxylic acid,
1,1,5-pentanetricarboxylic acid,
1,2,4-hexanetricarboxylic acid,
2-propyl-1,2,4-pentanetricarboxylic acid,
5-octene-3,3,6-tricarboxylic acid,
1,2,3-propanetricarboxylic acid,
1,2,4-benzenetricarboxylic acid,
1,3,5-benzenetricarboxylic acid,
3-hexene-2,2,3,4-tetracarboxylic acid,
1,2,3,4-benzenetetracarboxylic acid,
1,2,3,5-benzenetetracarboxylic acid,
benzenepentacarboxylic acid,
benzenehexacarboxylic acid, and the like. Copolymers of acrylic acid with an olefinically unsaturated monomer such as butadiene, styrene, ethyl acrylate, vinyl halide, and the like also can be employed. In addition, the dimerized and trimerized unsaturated fatty acids of, for example, linoleic acid, oleic acid, linolenic acid, undecylenic acid, and the like are useful. Polycarboxylic acids which have melting points below about 250° C. are desirable; the hydrocarbon dicarboxylic acids possessing melting points below about 200° C. are preferred.

In an additional preferred embodiment the invention is directed to novel curable, partially cured, and cured compositions comprising diepoxide and polycarboxylic acid anhydride in such relative amounts so as to provide from about 0.1 to about 4.0 carboxyl groups of the polycarboxylic acid anhydride per epoxy group of the diepoxide and preferably from about 0.8 to about 2.5 carboxyl groups per epoxy group. It should be noted that by the expression "carboxyl groups of the polycarboxylic acid anhydride" is meant the carboxyl groups which would be contained by the corresponding polycarboxylic acid. For example, succinic anhydride does not possess any carboxyl groups per se; however, the corresponding polycarboxylic acid is succinic acid which contains two free carboxyl groups. Thus, succinic anhydride has two carboxyl groups as applied in the above expression. In different language, by the expression "carboxyl groups of polycarboxylic acid anhydride" is meant the carboxyl groups contained in the "hydrated" polycarboxylic acid anhydride.

Illustrative polycarboxylic acid anhydrides include the aliphatic, aromatic and cycloaliphatic acid anhydrides. The preferred anhydrides are the dicarboxylic acid anhydrides and preferably the hydrocarbon dicarboxylic acid anhydrides which include, for example, phthalic anhydride,
tetrahydrophthalic anhydride,
hexahydrophthalic anhydride,
chlorendic anhydride,
maleic anhydride,
chloromaleic anhydride,
dichloromaleic anhydride,
citraconic anhydride,
isocitraconic anhydride,
glutaric anhydride,
adipic anhydride,
succinic anhydride,
itaconic anhydride,
heptylsuccinic anhydride,
hexylsuccinic anhydride,
methylbutylsuccinic anhydride,
methyltetrahydrophthalic anhydride,
n-nonenylsuccinic anhydride,
octenylsuccinic anhydride,
pentenylsuccinic anhydride,
propylsuccinic anhydride,
4-nitrophthalic anhydride,
1,2-naphthalic anhydride,
2,3-naphthalic anhydride,
1,8-naphthalic anhydride,
tetrabromophthalic anhydride,
tetraiodophthalic anhydride,
lower alkyl substituted bicyclo[2.2.1]hept-5-ene-2,3-dicarboxylic anhydride,
methylbicyclo[2.2.1]hept-5-ene-2,3-dicarboxylic anhydride and the like. Mixtures of anhydrides, polymeric anhydrides or mixed polymeric anhydrides of sebacic, adipic, pimelic, cyclohexane-1,4-dicarboxylic terephthalic and isophthalic acids are also useful as modifiers in the preparation of the novel compositions. Acid dianhydrides such as 1,2,4,5-benzenetetracarboxylic dianhydride likewise are effective modifiers. Polycarboxylic acid anhydrides which have melting points below about 250° C. are satisfactory; those anhydrides possessing melting points below about 200° C. are preferred.

In a further preferred embodiment, the invention is directed to novel curable, partially cured and cured compositions comprising diepoxide and polyol in such relative amounts as provided from about 0.1 to about 2.0 hydroxyl groups, i.e., —OH groups, of said polyol per epoxy group of said diepoxide, and preferably from about 0.2 to about 1.0 hydroxyl group per epoxy group. By the term "polyol," as used herein including the appended claims, is meant an organic compound having at least two hydroxyl groups, which are alcoholic hydroxyl groups, phenolic hydroxyl groups, or both alcoholic and phenolic hydroxyl groups. The term "polyol" preferably encompasses the polyhydric alcohols and the polyhydric phenols.

Illustrative of the polyols contemplated include, for example, the aliphatic and cycloaliphatic polyhydric alcohols, e.g.

ethylene glycol,
diethylene glycol,
the polyethylene glycols,
propylene glycol,
the polypropylene glycols,
the polyethylene-polypropylene glycols,
trimethylene glycol,
the butanediols,
the butenediols,
the pentanediols,
the pentenediols,
2-ethyl-1,3-hexanediol,
the hexenediols,
2-methoxy-2,4-dimethyl-1,5-pentanediol,
12,13-tetracosanediol,
glycerol,
polyglycerol,
1,1,1-trimethylolpropane,
pentaerythritol,
sorbitol,
the polyvinyl alcohols,
the octenediols,
the cyclopentanediols,
the lower alkyl substituted-cyclohexanediols,
inositol,
trimethylolbenzene, and the polyhydric phenols, e.g., resorcinol, catechol, pyrogallol, hydroquinone, the dihydroxytoluenes, dihydroxyxylene, bis(4-hydroxylphenyl)-2,2-propane, bis(4-hydroxyphenyl)methane, 1,9-naphthalenediol, the polyhydric phenol-formaldehyde condensation products, and the like. The alkylene oxide adducts, e.g., ethylene oxide, propylene oxide, etc., of polyhydric alcohols or polyhydric phenols such as those illustrated above also are highly suitable. Polyols prepared by the reaction of polyhydric alcohols or polyhydric phenols which contain at least three hydroxyl groups with an aliphatic monocarboxylic acid (described supra) to give an esterified product mixture having at least an average of two free or unaffected hydroxyl groups are highly useful. For example, one mol of glycerol can be reacted with one mol of an aliphatic monocarboxylic acid to give a mixture of glycerides which contains an average of two free hydroxyl groups per glyceride molecule in the reaction product. In addition, polyols prepared by the reaction of polyepoxides such as limonene dioxide,
4-vinylcyclohexene dioxide,
bis(2,3-epoxycyclopentyl) ether,
dicyclopentadiene dioxide,
divinylbenzene dioxide,
3,4-epoxy-6-methylcyclohexylmethyl 3,4-epoxy-6-methylcyclohexanecarboxylate,
diethylene glycol bis(3,4-epoxycyclohexanecarboxylate),
bis(3,4-epoxycyclohexylmethyl) pimelate,
1,1,1-trimethylolpropane tris(3,4-epoxycyclohexanecarboxylate),
and the like, with an aliphatic monocarboxylic acid (described supra), preferably at elevated temperatures, e.g., about 25° C. to about 250° C., with or without a catalyst described previously, are eminently desirable as the polyol component in the curable systems. The concentration of monocarboxylic acid employed is, at the lower limit, an amount which is sufficient to react with all the epoxy groups contained by the polyepoxide reagent to thus produce an esterified product which contains ester groups,

and generated hydroxyl groups, —OH. It should be borne in mind that for each epoxy group that is reacted with carboxyl group, there is formed an ester group and a hydroxyl group. The upper limit of the concentration of monocarboxylic acid which can be employed is an amount required to react with all the epoxy groups contained by the polyepoxide plus an amount required to esterify all the generated hydroxyl groups save two. Thus, the reaction product is aptly termed a "polyhydric polyester." By way of illustration, for example, if the polyepoxide is a diepoxide, e.g., 4-vinylcyclohexene dioxide, then the concentration of monocarboxylic acid necessary for the abovesaid reaction is an amount which would provide a ratio of one carboxyl group of said acid per epoxy group of said diepoxide. Expressed on a molar basis for convenience, two mols of said acid per one mol of said diepoxide are necessary. The resulting product in this illustration would be a diol diester. By way of a further illustration, for instance, if the polyepoxide is a triepoxide, e.g., 1,1,1-trimethylolpropane tris(3,4-epoxycyclohexanecarboxylate), then the minimum concentration of monocarboxylic acid necessary would be an amount which would provide a ratio of one carboxyl group of said acid per epoxy group of said triepoxide. Again expressed on a molar basis for convenience, three mols of said acid per mol of said triepoxide are necessary to obtain the triol triester product. It is apparent, therefore, that four mols of said acid per mol of said triepoxide would have resulted in a diol tetraester product. For this particular illustration, the upper limit of monocarboxylic acid would be an amount which provides a ratio of 1.33 carboxyl groups of acid per epoxy group of said triepoxide. To avoid any misinterpretation, the following equation is set forth:

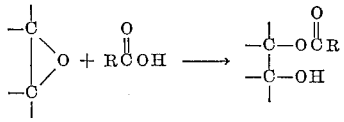

wherein the epoxy group is contained by the polyepoxide molecule, and wherein

is the aliphatic monocarboxylic acid. The above equation illustrates the mechanism by which a hydroxyl group and an ester group are formed.

Yet another preferred embodiment of the invention is directed to novel curable, partially cured and cured compositions comprising diepoxide and polycarboxy polyester in such relative amounts as provide from about 0.1 to about 2.0 carboxyl groups of said polycarboxy polyester per epoxy group of said diepoxide, and preferably from about 0.3 to about 1.2 carboxyl groups per epoxy group. By the term "polycarboxy polyester," as used herein including the appended claims, is meant a polyester which contains at least two carboxyl groups in the average molecule. The polycarboxy polyesters can be prepared by known condensation procedures, employing mol ratios favoring greater than equivalent amounts of polycarboxylic acid or polycarboxylic acid anhydrides with relation to the polyhydric alcohol. More specifically, the amount of polycarboxylic acid or polycarboxylic acid anhydride which is employed in the esterification reaction should contain more carboxyl groups, collectively, than are required to react with the hydroxyl groups contained in the amount of polyhydric alcohol so that the resulting esterified product, i.e., polycarboxy polyester, contains at least two free carboxyl groups in the average polycarboxy polyester molecule. The polycarboxylic acids, polycarboxylic acid anhydrides and the polyols which can be employed in the preparation of the polycarboxy polyesters have been illustrated previously. The polycarboxy polyesters can be obtained by condensing, in accordance with known procedures, a polyhydric alcohol and a polycarboxylic acid or a polycarboxylic acid anhydride. This condensation reaction may be conducted, for example, by heating the reactants to a temperature within the range from 100° C. to 200° C. with or without an acidic catalyst. Water formed by the condensation reaction may be removed by distillation. The course of the reaction may be followed by making acid number determinations and the reaction can be stopped when a suitable polycarboxy polyster has been obtained.

Additionally, a preferred embodiment is directed to curable, partially cured and cured compositions comprising diepoxide and a polyfunctional amine in such relative amounts so as to provide from about 0.2 to about 5.0 amino hydrogen atoms of the polyfunctional amine per epoxy group of the diepoxide, and preferably from about 0.8 to about 2.0 amino hydrogen atoms per epoxy group. By the term "polyfunctional amine," as used herein including the appended claims, is meant an organic amine having at least two active amino hydrogen atoms which can be on the same nitrogen atom or on different nitrogen atoms.

Among the polyfunctional amine subclasses contemplated include the aliphatic amines, aromatic amines, aralkyl amines, cycloaliphatic amines, alkaryl amines, aliphatic polyamines including polyalkylene polyamines, amino-substituted monohydric and polyhydric aliphatic alcohols and phenols, polyamides, addition products of polyamines and low molecular weight epoxides containing oxirane oxygen linked to vicinal carbon atoms, and others.

Illustrative polyfunctional amines include, for example, methylamine, ethylamine, propylamine, isopropylamine, butylamine, isobutylamine, 2-ethylhexylamine, 3-propylheptylamine, aniline, o-hydroxyaniline, m-toulidine, 2,3-xylidine, mesidine, benzylamine, phenethylamine, 1-naphthylamine, meta-, ortho- and para-phenylenediamines, 1,4-naphthalenediamine, 3,4 - toluenediamine, cyclopentylamine, cyclohexylamine, p-menthane - 1,8 - diamine, 2-aminoethanol, 2-aminopropanol, 3-aminobutanol, 1,3-diamino-2-propanol, 4-aminophenol, 2,3-diaminoxylenol, 4,4'-methylenedianiline, ethylenediamine, propylenediamine, butylenediamine, pentylenediamine, hexylenediamine, octylenediamine, nonylenediamine, decylenediamine, diethylenetriamine, triethylenetetramine, tetraethylenepentamine, dipropylenetriamine, and the like. The polyamides, i.e., those having an average molecular weight range from about 300 to about 10,000 including condensation products of polycarboxylic acids, in particular, hydrocarbon dicarboxylic acids, such as malonic acid, succinic acid, glutaric acid, adipic acid, dilinoleic acid, and the like, with polyamines, particularly diamines, such as ethylenediamine, propylenediamine, butylenediamine and the like, are also useful.

Other illustrations of polyfunctional amines are the addition products of polyamines, in particular, diamines and triamines and epoxides containing oxirane oxygen linked to vicinal carbon atoms, such as ethylene oxide, propylene oxide, butadiene dioxide, diglycidyl ether, epoxidized soybean oil, epoxidized safflower oil, and polyglycidyl polyesters of polyhydric phenols which result from the reaction of, for example, polyhydric phenols and epichlorohydrin. Particularly useful polyfunctional amines are the mono- and polyhydroxylalkyl polyalkylene polyamines which are preferably derived from the reaction of ethylenediamine, propylenediamine, diethylenetriamine, dipropylenetriamine, triethylenetetramine, and the like, with ethylene oxide, propylene oxide, and the like. This reaction can be conducted under pressure at temperatures of 50° C. or 55° C. to boiling in the absence of solvents or in the presence of water or an alcohol. However, the reaction is more advantageously carried out at temperatures below 40° C. and preferably below 35° C. without pressure. The amines so produced include the hydroxyalkyl-substituted alkylene polyamines such as N-hydroxyethylethylenediamine,
N,N'-bis(hydroxyethyl)ethylenediamine,
N,N-bis(hydroxyethyl)diethylenetriamine,
N,N'-bis(hydroxyethyl)diethylenetriamine,
N,N''-bis(hydroxyethyl)diethylenetriamine,
N-hydroxypropyldiethylenetriamine,
N,N-bis(hydroxypropyl)diethylenetriamine,
N,N''-bis(hydroxypropyl)diethylenetriamine,
N-hydroxyethylpropylenediamine,
N-hydroxyethyldipropylenetriamine,
N,N-bis(hydroxyethyl)dipropylenetriamine,
N,N'-bis(hydroxyethyl)dipropylenetriamine,
tris(hydroxyethyl)triethylenetetramine, and the like. Other polyfunctional amines can be prepared from known procedures by the addition reaction of polyglycidyl polyethers of polyhydric phenols and polyamines, in particular, polyalkylene polyamines. Of particular importance in forming these epoxide polyamine adducts are the diglycidyl diethers of dihydric phenols such as for example, the homologues of dihydroxydiphenylmethanes singly or mixed and the dihydroxydiphenyldimethylmethanes singly or mixed. Mixtures of diglycidyl diethers of dihydric phenols can be prepared by reacting epichlorohydrin with a dihydric phenol using a molar excess of epichlorohydrin over the theoretical molar requirement. Substantially pure cuts of the diglycidyl diethers then can be obtained by fractional distillation under reduced pressure, for example. Illustratively, the polyfunctional amine, i.e., the epoxide polyamine adduct itself can be prepared by mixing the diglycidyl polyether of a dihydric phenol with a polyalkylene diamine such as diethylenetriamine, dipropylenetriamine, and the like, bringing to an elevated temperature for example, up to about 200° C. and maintaining at such an elevated temperature for a period of from 4 to 5 hours. Alternatively, as an illustration, polyfunctional amines can be prepared by adding a diglycidyl diether of a dihydric phenol to a polyalkylene polyamine over a period of time, e.g., from about three to four hours, while maintaining the reaction mixture at an elevated temperature, for example up to about 200° C. and subsequently adding a dihydric phenol.

Examples of still other polyfunctional amines suitably adaptable for use in the present invention include, among others, heterocyclic nitrogen compounds such as piperazine, 2,5-dimethylpiperazine, and the like; aminoalkyl-substituted heterocyclic compounds such as N-(aminopropyl)morpholine, N-(aminoethyl)morpholine, and the like; amino-substituted heterocyclic nitrogen compounds such as melamine, 2,4-diamino-6-(aminoethyl)pyrimidine, and the like; dimethylurea, guanidine, 4,4'-sulfonyldianiline, 3,9-bis(aminoethyl)spirobimetadioxane, hexahydrobenzamine, and others.

Polyfunctional amines formed by the addition of amines to unsaturated compounds such as acrylonitrile, ethyl acrylate, propyl acrylate, butyl crotonate, and the like are suitable.

The invention also contemplates the modification of the properties and characteristics of the partially cured and fully cured compositions (resins) set forth previously in the discussion of the five previous preferred embodiments. Special and highly desirable effects can be imparted to the partially cured and fully cured compositions by incorporating a second active organic hardener (hereinafter termed "modifier") into the curable composition comprising diepoxides and "major" active organic hardener (i.e., polycarboxylic acid, polycarboxylic acid anhydride, polyol, polycarboxy polyester, and the like). The proportions of modifier to "major" active organic hardener are such that the number of reactive groups contained by an amount of the modifier with relation to the number of reactive groups contained by an amount of the "major" active organic hardener will be in a ratio that is less than one. It is to be understood that the term "reactive groups" pertains to groups which are reactive with the epoxy groups contained in the diepoxide. For instance, to a curable composition comprising epoxy ether and polycarboxylic acid, there can be added an amount of a modifier, e.g., polycarboxylic acid anhydride, polycarboxy polyester, polyol, etc., such that the ratio of reactive groups contained by the modifier with respect to the carboxyl groups contained by the polycarboxylic acid is less than one. On this basis the modifier can be considered to be the minor component in relation to the polycarboxylic acid. As a second illustration, if the curable composition comprises diepoxide and polyol, an amount of modifier; e.g., polycarboxylic acid, polycarboxy polyester, polycarboxylic acid anhydride, polyisocyanate, polythiol, polyfunctional amine, etc., can be added to said curable mixture such that the ratio of the reactive groups contained by the modifier with respect to the hydroxyl groups contained by the polyol is less than one. Again it will be noted that the modifier is the minor component with respect to the polyol. The modifiers which can be employed are those illustrated previously in the discussion of polycarboxylic acids, polycarboxylic acid anhydrides, polyols, polycarboxy polyesters, etc.

A further highly preferred embodiment is directed to curable, partially cured, and cured compositions comprising a diepoxide; a polycarboxylic acid anhydride which contains a polymerizable double bond, and an active olefinically unsaturated organic monomer. To the curable mixture there can be added a fourth component, that is, of polyol such as those previously described. The polyol can contain olefinic unsaturation or it can be fully saturated. However, should the polyol contain olefinic unsaturation, then the polycarboxylic acid anhydride component can be fully saturated. Thus, in the four component system both the polycarboxylic acid anhydride and the polyol components can contain olefinic unsaturation, or either component can contain olefinic unsaturation. The three and four component curable systems have been found to possess several highly desirable and unexpected advantages. The preferred systems cure very readily and gelation is often manifest at room temperature. The resulting cured resins exhibit extremely high and efficient thermal stability at elevated temperatures by virtue of including the active olefinically unsaturated organic monomer in the curable compositions. The inclusion of the active olefinically unsaturated organic monomer to the curable system also results in the lowering of the melt temperature and in the reduction of the viscosity of the system as compared to the corresponding curable system lacking same. The saturated and unsaturated polycarboxylic acid anhydrides and polyols have been illustrated previously. Maleic anhydride is highly preferred as the polycarboxylic acid anhydride component. It is desirable that the relative proportions of diepoxide, polycarboxylic acid anhydride, and active olefinically unsaturated organic monomer with or without the polyol component (preferably polyhydric alcohol compounds) comprising the curable, partially cured, and cured compositions are such as to provide from about 0.2 to about 5.0 preferably from about 0.4 to about 2.0, carboxyl groups of anhydride per epoxy group of diepoxide and from 0.0 to about 2.0, preferably from 0.05 to about 1.0 hydroxyl group of polyol per epoxy group of diepoxide. The quantity of active olefinically unsaturated organic monomer is most conveniently based on a ratio of ethylenic groups of monomer per ethylenic group of anhydride and/or polyol. Thus, it is desirable to employ the polycarboxylic acid anhydride, polyol, and active olefinically unsaturated organic monomer in amounts so as to provide from about 0.002 to about 5.0, preferably from about 0.2 to about 2.0, ethylenic groups of active olefinically unsaturated organic monomer per ethylenic group of polycarboxylic acid anhydride and/or polyol. It should be noted that the term "ethylenic group" refers to the $>C=C<$ group. Illustrative active olefinically unsaturated monomers include the mono- and polyolefinic hydrocarbons, e.g., the heptenes, the nonenes, hexadiene, cyclopentene, cyclohexene, lower alkyl substituted cyclohexene, styrene, divinylbenzene, and the like; the olefinic esters, ether, and acids, e.g., divinyl ether, diallyl ether, di(2-butenyl) ether, methyl methacrylate, propyl acrylate, methyl acrylate, ethyl acrylate, methyl crotonate, allyl crotonate, crotonic acid, cinnamic acid, acrylic acid, diallyl phthalate, 2-pentenoic acid, and the like; and the halogenated vinylbenzenes, and the like. Styrene is highly preferred.

The use of catalysts in the novel curable composition described in the last embodiment is optional. Catalysts such as those described previously can be employed if desired, to increase the rate of reaction between the polycarboxylic acid anhydride and diepoxide. In certain instances it may be desirable to foster the reaction or polymerization of the polycarboxylic acid anhydride and the active olefinically unsaturated organic monomer. Among such latter catalysts are included by way of illustration, benzoyl peroxide, t-butyl hydroperoxide, cumene hydroperoxide, acetyl peroxide, p-menthane hydroperoxide, lauroyl peroxide, di-t-butyl peroxide, and the like.

A further highly preferred embodiment is directed to curable and partially cured compositions (thermosetting intermediate reaction products that are viscous liquids or solids) comprising diepoxides and an active organic hardener, with or without a modifier, said compositions being dissolved in an inert normally-liquid organic medium such as xylene, methyl isobutyl ketone, butyl acetate, ethyl acetate, toluene, amyl acetate, and the like. The compositions dissolved in the above exemplary list of organic media can be used as, for example, surface coating which can be subsequently heat cured to hard, tough, scratch-resistant coatings.

The proportion of partially cured resin, i.e., thermosetting intermediate reaction products, to organic media will depend on various factors such as the particular mixture being cured, the degree or extent of the partial cure, the particular organic medium employed, and other considerations. In general, a solution comprising from about 10 to about 90 weight percent of the partially cured resin, based on the total weight of partially cured resin and organic medium, is suitable; from about 40 to 70 weight percent of the partially cured resin, based on the total weight of partially cured resin and organic medium is preferred. Moreover, the uncured compositions can be dissolved in the organic media exemplified above and applied to surfaces and subsequently heat cured to form hard, tough coatings. Should the solution comprising the uncured composition or partially cured composition tend to "run" when applied to the surface, a conventional wetting agent and/or thixotropic agent can be added to the solution mixture to ensure a more uniform coating on the surface.

In yet another preferred embodiment, the invention is directed to the homopolymerization of diepoxides in the presence of a catalyst at a temperature in the range of from 25° C. to about 250° C. to produce products ranging from viscous liquids to hard, tough resins.

It is generally suitable to add the catalyst to the monomer which is maintained at a temperature in the range of from about 10° C. to 25° C. Agitation of the monomer composition prior to, during, and after the incorporation of the catalyst is desirable. Catalyst concentrations and polymerization temperatures are believed to affect the polymerization rate, the higher concentrations and temperatures promoting faster polymerization than the lower ones. Catalyst concentrations can be varied over a broad range and can be selected on the basis of the rate of polymerization desired and the polymerization temperature to be used. It has been found that catalyst concentrations from about 0.005 or lower, to 15 weight percent or higher, preferably from about 0.01 to 5 weight percent, based on the weight of the diepoxide monomer are advantageous in forming useful homopolymeric resins. After the reaction mixture has been formed, the mixture is heated to a temperature in the range of from about 50° C. to 160° C. to effect a gel. After gelation, a post cure is generally carried out at temperatures in the range of from 100° C. to 250° C. for a period of time ranging from thirty minutes to ten hours depending on the temperature, catalyst and amount of catalyst. The resin products produced are hard, infusible products suitable for use in castings which can be machined to make a variety of useful products.

Basic and acidic catalysts which can be employed in the homopolymerization process of the monomer compositions include, for example, the metal halide Lewis acids, e.g., boron trifluoride, aluminum chloride, zinc chloride, stannic chloride, ferric chloride, boron trifluoride-piperidine complex, boron trifluoride-1,6-hexanediamine complex, boron trifluoride-dimethyl ether complex, boron trifluoride-diethyl ether complex, boron trifluoride-dipropyl ether complex, and the like; the strong mineral acids, e.g., sulfuric acid, phosphoric acid, polyphosphoric acid, perchloric acid, and the like; the saturated aliphatic hydrocarbon sulfonic acids and the aromatic hydrocarbon sulfonic acids, e.g., ethylsulfonic acid, propylsulfonic acid, benzenesulfonic acid, toluenesulfonic acid, naphthalenesulfonic acid, lower alkyl substituted benzenesulfonic acid, and the like; the alkali metal hydroxides, e.g., sodium hydroxide, potassium hydroxide, and the like; the amines, e.g., alpha-methylbenzyldimethylamine, dimethylethylamine, triethylamine, tripropylamine, trimethylammonium hydroxide, and the like. When the catalyst and monomers are immiscible, the catalyst can be added as a solution in an inert normally-liquid organic medium. Typical media for the catalysts include the organic ethers, e.g., diethyl ether, dipropyl ether, and the like; the organic esters, e.g., methyl acetate, ethyl acetate, methyl propionate, ethyl propionate, and the like; the organic ketones, e.g., acetone, cycloehxanone, methylcyclohexanone, and the like.

An additional preferred embodiment of the invention pertains to the homopolymerization compositions of a mixture of diepoxides of the invention to obtain a resin having physical properties superior to those of each of the individual homopolymerized diepoxide. For example, a hard tough homopolymer can be made more impact resistant by the incorporation of another diepoxide.

In another preferred embodiment, the invention is directed to the preparation of valuable varnishes which are obtained by the reaction of diepoxide with aliphatic monocarboxylic acids, at elevated temperatures, e.g., about 100° to 200° C., for a period of time ranging from 0.5 to 10 hours, and longer, followed by homopolymerizing the resulting reaction product (which contains residual or free epoxy and hydroxyl groups) with a catalyst such as those described previously, preferably at a temperature in the range of from about 25° to 200° C., to thus produce high molecular weight polymeric products commonly known to the art as a varnish. The amounts of aliphatic monocarboxylic acid and diepoxide employed are such so as to provide from about 0.3 to about 0.7 carboxyl group of monocarboxylic acid per epoxy group of diepoxide. The unsaturated aliphatic monocarboxylic acids are preferred. Illustrative acids include hexanoic acid, caprylic acid, lauric acid, capric acid, myristic acid, oleic acid, linoleic acid, linolenic acid, eleostearic acid, licanic acid, ricinoleic acid, hexenoic acid, hexadenioic acid, octenoic acid. Acids derived from natural sources such as castor oil, dehydrated castor oil, coconut oil, cottonseed oil, oiticica oil, perilla oil, olive oil, safflower oil, sardine oil, soya bean oil, tall oil, tung oil, and the like, are advantageous to employ both from an economic standpoint and since highly useful varnishes result from the process. If desired, the reaction between the diepoxide and the aliphatic monocarboxylic acid can be effected in the presence of a catalyst such as those described previously, and also, the reaction can be conducted in the presence of an inert normally-liquid organic medium. Suitable media include, for instance, the aromatic hydrocarbons, e.g.; benzene, toluene, xylene and the like; the saturated aliphatic and cycloaliphatic hydrocarbons, e.g., hexane, heptane, cyclopentane, cyclohexane, lower alkyl substituted-cyclohexane, and the like; the oxygenated organic compounds, e.g., ethyl acetate, butyl acetate, amyl acetate, acetone, methyl ethyl ketone, methyl isobutyl ketone, cyclohexanone, tetrahydrofuran, dioxane, diisopropyl ether, and the like.

The homopolymerizing of the reaction product which contains residual or free epoxy and hydroxyl groups can also be effected, if desired, in the presence of an inert normally-liquid organic medium such as those illustrated supra. The progress of the homopolymerization reaction can be observed by determining the relative viscosity of samples drawn from the reaction mixture. In this manner it is possible to produce partially polymerized compositions or essentially complete polymerized compositions.

The polymerized compositions of this embodiment generally are obtained as very viscous products. These polymerized compositions can be classified as drying compositions or non-drying compositions. The former are those which contain ethylenic unsaturation whereas the latter are saturated compositions. Both the drying and non-drying compositions are useful as modifiers for coating resins such as phenol-formaldehyde resins, melamine-formaldehyde resins, alkyl resins, and the like. These compositions are outstanding as modifiers because they have a wide range of compatibility, they impart improved caustic, water and chemical resistance to the resin coatings they are modifying, and they impart improved flexibility and toughness. The drying compositions are capable of "drying" or curing to excellent protective coatings with or without the application of heat. It is generally desirable to employ various metallic salts of organic compounds known to the art as "driers," to accelerate the drying process. The drying can be accomplished at temperatures in the range of from about 10° to about 250° C. for a period of time sufficient to produce the desired property in the resin. The concentration of the drier compound can range from about 0.001 to about 5.0 weight percent, and higher, based on the weight of the drying compound (polymer). Suitable driers include soluble compounds containing heavy metals, e.g., cobalt, lead, manganese, calcium, zinc, iron, and the like. Examples of such driers include cobalt naphthenate, lead octanoate, and the like. The drying compositions can be treated in the various ways familiar to the varnish and paint industries to produce special or advantageous effects.

In a still further preferred embodiment valuable varnish compositions can be obtained by the reaction of diepoxide with polyols, at a temperature in the range of from about 25° to 250° C., for a period of time ranging from about 0.5 to 10.0 hours, and longer, followed by partial or essentially complete esterification of the fusible, polymeric polyhydric product with an aliphatic monocarboxylic acid, at elevated temperatures, to produce high molecular weight polymeric products (varnishes) which may contain residual or free hydroxyl groups. The proportions of polyol and diepoxide employed are such as to provide from about 0.5 to about 1.5 hydroxyl groups of polyol per epoxy group of diepoxide. The polyols and aliphatic monocarboxylic acids which can be employed have been illustrated previously. The use of catalysts and solvents, if desired, have also been discussed supra.

As further embodiments, valuable thermoset resins can be prepared from curable compositions comprising diepoxide(s) an active organic hardener(s), and other polyepoxides such as limonene dioxide,
4-vinylcyclohexene dioxide,
dicyclopentadiene dioxide,
divinylbenzene dioxide,
3,4-epoxy-6-methylcyclohexylmethyl, 3,4-epoxy-6-methylcyclohexanecarboxylate,
diethylene glycol bis(3,4-epoxycyclohexanecarboxylate),
bis(2,3-epoxycyclopentyl) ether,
bis(3,4-epoxycyclohexylmethyl) pimelate,
1,1,1-trimethylolpropane tris (3,4-epoxycyclohexanecarboxylate), the polyglycidyl polyethers of polyhydric phenols, and the like. The curing of these novel curable compositions has been disclosed supra.

In some instances, the diepoxide is a mobile liquid thus making it admirably suitable as a reactive diluent when incorporated into various viscous curable systems containing a polyepoxide. In such cases, the diepoxide acts as a diluent thus reducing the viscosity of the curable system, and in addition, the diepoxide takes part in the curing reaction as a reactive component.

The cured resins of the invention vary from soft and flexible to hard and rigid products, depending upon the proportion, the functionality, and the chain length of the active organic hardener(s) employed. These resins are insoluble in many of the organic solvents. The hard, infusible, rigid, thermoset resins can be machined to desired shapes and configurations, and they can be polished to provide appealing finishes. The novel compositions, as indicated throughout the specification, are highly useful and valuable in fields such as the coatings, laminating, molding, encapsulation, etc., arts.

In the following illustrative examples, the examination and description of the resins were conducted at room temperature, i.e. about 24° C. The Barcol hardness values were determined by the use of Barcol Impressor GYZJ–934–1 at a temperature of 25° C.

Example 1

To a three-liter bomb was charged 251 grams, 95 weight percent dicyclopentadiene, 615 grams butadiene, and 7 grams beta-naphthylphenylamine. The mixture was then heated to 200° C. for five hours and allowed to cool to room temperature. The reaction product mixture was distilled under reduced pressure. The fractionated reaction product included 276 grams of vinylcyclohexene (62 weight percent based on the reacted butadiene) and 480 grams of bicyclo[4.3.0]nona-3,8-diene (25 percent based on reacted butadiene). The bicyclo[4.3.0]nona-3,8-diene had the following properties:

Boiling point, 87° C. at 75 millimeters Hg.
Refractive index, $n$ 30/D 1.4924.

Example 2

To a reaction vessel which contained 367 grams bicyclo[4.3.0]nona-3,8-diene, maintained at 20° C. with stirring, there was added dropwise, over a period of three hours and forty minutes, 1878 grams of a 28.1 weight percent solution of peracetic acid in ethyl acetate. After an additional two and one-half hours at 25–30° C., the reaction was complete as indicated by analysis for peracetic acid. After storing at −5° C. overnight, the reaction product mixture was added dropwise to 1500 grams ethylbenzene which was refluxing under reduced pressure. Ethyl acetate, excess peracetic acid, acetic acid, and, finally, ethylbenzene were distilled overhead. The kettle temperature was raised to 80° C. at 7.0 millimeters Hg. The residue, 570 grams, was distilled in another column to recover the desired reaction product. There was obtained 388 grams of 4,10-dioxatetracyclo[5.4.0.0$^{3,5}$.0$^{9,10}$]undecane having the following properties:

Purity-epoxide determination (pyridine hydrochloride method) _____ 99 percent.
Boiling point _____ 83° C. at 0.6 millimeter, Hg.
Refractive index _____ $n$ 30/D 1.5011.

Example 3

To a three-liter stainless steel pressure bomb, there was charged 480 grams of dimethyldicyclopentadiene, 324 grams of butadiene, and 0.8 gram of cobaltacene (as inhibitor for butadiene polymerization). The bomb was sealed and heated to 170° C. over a period of three hours. For an additional four hours, the reaction mixture was heated in the temperature range of 170° C. to 176° C. The reaction product mixture was cooled to room temperature, filtered and distilled on a 32-millimeter x 36-inch column packed with stainless steel protruded packing. There was obtained 156 grams of methylbicyclo[4.3.0]nonadiene, a mixture of 8- and 9-methylbicyclo[4.3.0]nona-3,8-diene having the following properties:

Boiling point, 60° C.–66° C. at 10 millimeters Hg.
Refractive index, $n$ 30/D 1.4892–1.4920.

Example 4

To a reaction vessel which contained 141 grams of methylbicyclo[4.3.0]nona-3,9-diene of Example 3, maintained at 30° C., with stirring, by means of an ice bath, there was added over a period of two hours and twenty-five minutes 787 grams of a 25.5 weight percent solution of peracetic acid in ethyl acetate. The reaction mixture was maintained at a temperature of 26–30° C. for an additional four hours. At this time, an analysis for peracetic acid indicated that the reaction was complete. The volatiles were removed from the reaction mixtures by codistillation with ethylbenze and the residue product thus obtained was distilled on a 26-millimeter x 4-inch glass-helix-packed column to give 98 grams of a mixture of 4,10-dioxatetracyclo[5.4.0.0$^{3,5}$.0$^{9,11}$]-9-methylundecane and 4,10-dioxatetracyclo[5.4.0.0$^{3,5}$.0$^{9,11}$]-11-methylundecane having the following properties:

Boiling point _____ 98° C. at 2 millimeters to 107° C. at 3 millimeters Hg.
Refractive index _____ $n$ 30/D 1.4890–1.4920.
Analysis:
  Calculated for $C_{10}H_{14}O_2$ ___ C, 72.26%; H, 8.49%.
  Found _____ C, 72.43%; H, 8.72%.

Example 5

A three-liter stainless pressure bomb was charged with 656 grams of 2-methyl-1,3-pentadiene, 528 grams of dicyclopentadiene, and 1.2 grams colbaltacene inhibitor, sealed and heated at 160–177° C. for four and one-half hours. After cooling to room temperature, the contents of the bomb were flash distilled. The distillate was fractionated on a 32-millimeter x 36-inch packed column. There was obtained 117 grams of dimethylbicyclo[4.3.0]nona-3,8-diene, a mixture of 3,5-dimethylbicyclo[4.3.0]nona-3,8-diene and 2,4-dimethylbicyclo[4.3.0]nona-3,8-diene having the following properties:

Boiling point, 52–55° C. at 5 millimeters Hg.
Refractive index, $n$ 30/D 1.4890–1.4920.

Example 6

To a reaction vessel which contained 103 grams of dimethylbicyclo[4.3.0]nona-3,8-diene of Example 5, maintained at 25–30° C. with stirring, by means of an ice bath, there was added over a period of two hours and twenty minutes 529 grams of a 25 weight percent solution of peracetic acid in ethyl acetate. The reaction mixture was maintained at a temperature of 27° C. for an additional four hours. At this time, an analysis for peracetic acid indicated that the reaction was complete. The volatiles were removed from the reaction mixture by codistillation with ethylbenzene, and the residue product thus obtained was distilled on a 26-millimeter x 4-inch glass-helix-packed column to give 65 grams of a mixture of 4,10 - dioxatetracyclo[5.4.0.0$^{3,5}$.0$^{9,11}$] - 3,6 - dimethylundecane and 4,10-dioxatetracyclo[5.4.0.0$^{3,5}$.0$^{9,11}$]-2,5-dimethylundecane having the following properties:

Boiling point _____ 78° C. at 0.15 millimeter to 85° C. at 0.13 millimeter Hg.
Refractive index _____ $n$ 30/D 1.4818–1.4894.
Analysis:
  Calculated for $C_{11}H_{16}O_2$ __ C, 73.29%; H, 8.95%.
  Found _____ C, 73.36%; H, 8.89%.

Example 7

A three-liter stainless pressure bomb was charged with 387 grams of 1-methoxybutadiene, 609 grams of cyclopentadiene, and 0.9 gram cobaltocene inhibitor, sealed and heated at 178–182° C. for four hours. After cooling to room temperature, the contents of the bomb were filtered and flash distilled. The distillate was fractionated on a 1¼-inch x 24-inch packed column. There was obtained 138 grams of methoxybicyclo[4.3.0]nona-3,8-diene, a mixture of 2-methoxybicyclo[4.3.0]nona-3,8-diene and 5-methoxybicyclo[4.3.0]nona-3,8-diene, having the following properties:

Boiling point, 75–70° C. 10–4 millimeters Hg.
Refractive index, $n$ 30/D 1.4910–1.4902.

Example 8

To a reaction vessel which contained 135 grams of methoxybicyclo[4.3.0]nona-3,8-diene of Example 7, maintained at room temperature, with stirring, there was added over a period of two hours and forty-five minutes 622 grams of a 24.2 weight percent solution of peracetic acid in ethyl acetate. The reaction mixture was maintained at a temperature of 25–40° C. for an additional seven hours. At this time, an analysis for peracetic acid indicated that the reaction was complete. The volatiles were removed from the reaction mixture by codistillation with ethylbenzene, and the residue product thus obtained was distilled on a ¾ x 4-inch glass-helix-packed column to give 77 grams of a mixture of 4,10-dioxatetracyclo-[5.4.0.0$^{3,5}$.0$^{9,11}$]-2-methoxyundecane and 4,10-dioxatetracyclo[5.4.0.0$^{3,5}$.0$^{9,11}$]-6-methoxyundecane having the following properties:

Boiling point _____ 90° C.–115° C. at 6 millimeters Hg.
Refractive index _____ n 30/D 1.4929–1.4946.
Analysis:
    Calculated for $C_{10}H_{14}O_3$ __ C, 65.91%; H, 7.74%.
    Found _____ C, 65.27%; H, 7.59%.

Example 9

A three-liter stainless pressure bomb was charged with 560 grams of 1-acetoxybutadiene, 660 grams of dicyclopentadiene, and 1.2 grams cobaltacene inhibitor, sealed and heated at 177–185° C. for four hours. After cooling to room temperature, the contents of the bomb were filtered and flash distilled. The distillate was fractionated on a 32-millimeter x 24-inch packed column. There was obtained 94 grams of acetoxybicyclo[4.3.0]nona-3,8-diene, a mixture of 2-acetoxybicyclo[4.3.0]nona-3,8-diene and 5-acetoxybicyclo[4.3.0]nona - 3,8-diene, having the following properties:

Boiling point, 87–89° C. at 4 millimeters Hg.
Refractive index, n 30/D 1.4908.

Example 10

To a reaction vessel which contained 141 grams of acetoxybicyclo[4.3.0]nona-3,8-diene of Example 9, maintained at 25–30° C., with stirring, there was added over a period of one and one-half hours 587 grams of a 23 weight percent solution of peracetic acid in ethyl acetate. The reaction mixture was maintained at a temperature of 40° C. for an additional four hours. At this time, an analysis for peracetic acid indicated that the reaction was 83 percent complete. The temperature was raised to 50° C.–55° C. for four hours to complete the reaction. The volatiles were removed from the reaction mixture by codistillation with ethylbenzene, and the residue product thus obtained was distilled on a 26-millimeter x 5-inch glass-helix-packed column to give 80 grams of a mixture of 4,10-dioxatetracyclo[5.4.0.0$^{3,5}$.0$^{9,11}$] - 2-acetoxyundecane and 4,10-dioxatetracyclo[5.4.0.0$^{3,5}$.0$^{9,11}$] - 6-acetoxyundecane having a boiling point 112° C. at 0.12 millimeter Hg to 128° C. at 0.12 millimeter Hg, which solidified on standing. After crystallization from ethanol, the product had a melting point of 96–97° C.

*Analysis.*—Calculated for $C_{11}H_{14}O_4$: C, 62.84%; H, 6.71%. Found: C, 63.14%; H, 6.86%.

Example 11

4,10 - dioxatetracyclo[5.4.0.0$^{3,5}$.0$^{9,11}$]undecane (0.8 gram) and 0.4 gram boron trifluoride-piperidine were mixed in a test tube. A gel was obtained after 0.2 hour at 80° C. The mixtures were cured for 5 hours at 80° C., 8 hours at 120° C. and 6 hours at 160° C. There was obtained a hard homopolymeric product.

Example 12

4,10 - dioxatetracyclo[5.4.0.0$^{3,5}$.0$^{9,11}$]undecane (0.8 gram) and diethylenetriamine (0.18 gram) were mixed in a test tube. A gel was obtained after 1.5 hours at 120° C. After heating for 5 hours at 80° C., 8 hours at 120° C. and after post curing for 6 hours at 160° C., there was obtained a hard resin.

Example 13

4,10 - dioxatetracyclo[5.4.0.0$^{3,5}$.0$^{9,11}$]undecane (0.8 gram) and p,p′-methylenedianiline (0.5 gram) were mixed in a test tube. After heating for 13 hours at 120° C. and 6 hours at 160° C., there was obtained a hard resin.

Example 14

4,10 - dioxatetracyclo[5.4.0.0$^{3,5}$.0$^{9,11}$]undecane (0.8 gram) and adipic acid (0.55 gram) were mixed in a test tube. After heating for 14 hours at 120° C. and 6 hours at 160° C., there was obtained a hard resin.

Example 15

4,10 - dioxatetracyclo[5.4.0.0$^{3,5}$.0$^{9,11}$]undecane (0.8 gram) and phthalic anhydride (0.74 gram) were mixed in a test tube. A gel was obtained after 0.5 hour at 120° C. After heating for 7.5 hours at 120° C. and 6 hours at 160° C., there was obtained a strong resin, Barcol, 48.

Example 16

4,10 - dioxatetracyclo[5.4.0.0$^{3,5}$.0$^{9,11}$]undecane (6.25 grams), maleic anhydride (3.22 grams, 0.8 carboxyl group per epoxide group) and ethylene glycol (0.53 gram, 0.2 hydroxyl group per epoxide group) were mixed at room temperature and allowed to stand overnight. After this time (about 16 hours), the mixture was a hard, tough resin. After remaining at room temperature (24° C.) for 91 hours, the resin was cured for 25 minutes at 120° C. and for 6 hours at 160° C. The cured resin was light yellow, tough resin, having a Barcol hardness of 60.

Examples 17–18

4,10 - dioxatetracyclo[5.4.0.0$^{3,5}$.0$^{9,11}$]undecane, maleic anhydried, and ethylene glycol were mixed in various proportions at room temperature and were stirred until homogeneous. The mobile solutions were poured into bar molds and remained at room temperature overnight during which time gelation occurred. The resins were post cured for 4.5 hours at 50° C., 2 hours at 80° C., 1.5 hours at 120° C. and six hours at 160° C. The following data were observed.

Formulation 1:
    23.8 grams 4,10-dioxatetracyclo[5.4.0.0$^{3,5}$.0$^{9,11}$]undecane
    9.2 grams maleic anhydride (0.6 carboxyl group per epoxy group)
    2.0 grams ethylene glycol (0.2 hydroxyl group per epoxy group)

Formulation 2:
    21.9 grams 4,10-dioxatetracyclo[5.4.0.0$^{3,5}$.0$^{9,11}$]undecane
    11.3 grams maleic anhydride (0.8 carboxyl group per epoxy group)
    1.8 grams ethylene glycol (0.2 hydroxyl group per epoxy group)

| Cure | Heat Distortion Temperature, ° C | |
|---|---|---|
| | Formulation 1 | Formulation 2 |
| After initial cure | 179 | 163 |
| +8 hrs. at 200° C | 240 | 246 |
| +8 hrs. at 250° C | 260 | 253 |

These data illustrate the excellent thermal stability and high softening temperatures of the resin system. The low viscosity of the curable mixtures at room temperature and the room temperature gelation are also very desirable features in the manufacture of void-free castings.

Examples 19–20

4,10-dioxatetracyclo[5.4.0.0$^{3,5}$.0$^{9,11}$]undecane and the following anhydride formulations were mixed and poured into bar molds at 50° C. The following data are pertinent. Barcol hardness range from 43 to 48.

Formulation 1:
   17.5 grams 4,10-dioxatetracyclo[5.4.0.0$^{3,5}$.0$^{9,11}$]undecane
   14.4 grams hexahydrophthalic anhydride
   3.1 grams 1,2,6-hexanetriol Formulation 2:
   16.6 grams 4,10-dioxatetracyclo[5.4.0.0$^{3,5}$.0$^{9,11}$]undecane
   15.5 grams methylbicyclo[2.2.1]hept-5-ene-2,3-dicarboxylic anhydride
   2.9 grams 1,2,6-hexanetriol

| Formulation | Initial Cure, Hours at °C. | Heat Distortion Temperature, °C. | |
|---|---|---|---|
| | | Initial Cure | + 8 hours at 200° C. |
| 1 | 2.5 at 50<br>3.0 at 80<br>1.0 at 100<br>16.5 at 120<br>6 at 160 | 138 | 146 |
| 2 | 2.5 at 50<br>3.0 at 80<br>1.0 at 100<br>16.5 at 120<br>6 at 160 | 130 | 153 |

*Examples 21–30*

The following examples illustrate the ratios for preparing resins from 4,10-dioxatetracyclo[5.4.0.0$^{3,5}$.0$^{9,11}$]undecane, maleic anhydride and 1,1,1-trimethylolpropane. The reactants were mixed in test tubes and were cured at the temperatures indicated. The formulations were mobile liquids at room temperature except for runs 28 to 30. The pertinent formulation and curing data are given in the following Table I.

TABLE I

| No. | Weight Components, grams [1] | | Ratio, Epoxide/Carboxyl/Hydroxyl | Gel Time, Hours at 120° C. | Resin Characteristics. Heated 6 hours at 160° C. |
|---|---|---|---|---|---|
| | Maleic Anhydride | 1,1,1-trimethylolpropane | | | |
| 21 | 0.05 | 0.02 | 1.0/.1/0.05 | | Soft gel. |
| 22 | 0.10 | 0.05 | 1.0/0.2/0.1 | | Hard. |
| 23 | 0.20 | 0.05 | 1.0/0.4/0.1 | 0.75 | Strong, Barcol=40. |
| 24 | 0.40 | 0.09 | 1.0/0.8/0.2 | 0.25 | Strong, Barcol=56. |
| 25 | 0.60 | 0.13 | 1.0/1.2/0.3 | 0.25 | Strong, Barcol=57. |
| 26 | 0.90 | 0.18 | 1.0/1.8/0.4 | 0.25 | Strong, Barcol=55. |
| 27 | 1.20 | 0.18 | 1.0/2.5/0.4 | 0.75 | Hard, Tough. |
| 28 | 1.50 | 0.18 | 1.0/3.0/0.4 | 0.75 | Do. |
| 29 | 1.70 | 0.18 | 1.0/3.5/0.4 | 0.75 | Tough, Opaque, Hard. |
| 30 | 2.0 | 0.18 | 1.0/4.0/0.4 | 0.75 | Do. |

[1] 0.82 grams of 4,10-dioxatetracyclo [5.4.0.0$^{3,5}$.0$^{9,11}$] undecane in every case.
All the resins were post cured for six hours at 160° C. and then had the above properties at room temperature.

*Examples 31–36*

An adduct of propylene oxide and 1,2,6-hexanetriol was prepared in such proportions that a polyol having a hydroxyl equivalent weight of 240 was obtained. This polyol (2130 grams) and maleic anhydride (1125 grams) were condensed at 100° C. for 12 hours. After this time, a polycarboxylic acid was obtained which had a carboxyl equivalent weight of 264.

This polester-polycarboxylic acid was mixed with 4,10-dioxatetracyclo[5.4.0.0$^{3,5}$.0$^{9,11}$]undecane in various proportions and the mixtures were cured in test tubes. The pertinent data are given in the following Table II.

TABLE II

| Example | Diepoxide, Grams [1] | Weight Acid, Grams | Ratio, Carboxyl/Epoxide | Gel Time, Hours at 120° C. | Total Cure, Hours at °C. | Resin Description |
|---|---|---|---|---|---|---|
| 31 | 0.82 | 0.26 | 0.10 | | 3 at 120<br>6 at 160 | Viscous.<br>Liquid. |
| 32 | 0.82 | 0.52 | 0.20 | | 3 at 120<br>6 at 160 | Tough.<br>Soft. |
| 33 | 0.82 | 1.04 | 0.4 | 2.5 | 3 at 120<br>6 at 160 | Hard.<br>Tough. |
| 34 | 0.82 | [2] 1.04 | 0.4 | 0.1 | 3 at 120<br>6 at 160 | Tough.<br>Barcol=20. |
| 35 | 0.82 | 1.56 | 0.6 | 2.5 | 3 at 120<br>6 at 160 | Hard.<br>Tough. |
| 36 | 0.41 | 1.32 | 1.0 | | 3 at 120<br>6 at 160 | Flexible.<br>Tough. |

[1] Grams of 4,10-dioxatetracyclo[5.4.0.0$^{3,5}$.0$^{9,11}$] undecane.
[2] Plus 0.05 gram of stannous octoate catalyst.

*Examples 37–46*

The following examples illustrate the conditions for preparing resins from 4,10-dioxatetracyclo[5.4.0.0$^{3,5}$.0$^{9,11}$]-9 and 11-methylundecane and various hardeners. The reactants were mixed in test tubes and the mixtures were heated at 80° C. for 1 hour, 120° C. for 2 hours, and 160° C. for 6 hours. The pertinent data are given in the following Table III.

TABLE III

| Example | Diepoxide, Grams [1] | Hardner | Hardner, Grams | Resin Description |
|---|---|---|---|---|
| 37 | 0.8 | p,p'-Methylenedianiline | 0.5 | Hard solid. |
| 38 | 0.8 | Diethylenetriamine | 0.2 | do |
| 39 | 0.8 | Phthalic anhydride | 1.1 | do |
| 40 | 0.8 | Maleic anhydride | 0.5 | do |
| 41 | 0.8 | Adipic acid | 0.55 | do |
| 42 | 0.8 | 1,2,6-hexanetriol and boron trifluoride-monoethylamine | 0.2, 0.05 | do |
| 43 | 0.8 | Bisphenol A and 15 percent potassium hydroxide in ethylene glycol. | 0.96, [2] 0.06 | do |
| 44 | 0.8 | Boron trifluoride-monoethylamine. | 0.05 | do |
| 45 | 0.8 | 4.5 percent sulfuric acid in ethylene glycol. | [3] 0.06 | Soft. |
| 46 | 0.8 | 4.5 percent sulfuric acid in water. | [3] 0.04 | do |

[1] A mixture of 4,10-dioxatetracyclo[5.4.0.0$^{3,5}$.0$^{9,11}$]-9-methylundecane and 4,10-dioxatetracyclo[5.4.0.0$^{3,5}$.0$^{9,11}$]-11-methylundecane.
[2] As potassium hydroxide.
[3] As sulfuric acid.

*Examples 47–56*

The following examples illustrate the conditions of preparing resins from 4,10-dioxatetracyclo[5.4.0.0$^{3,5}$.0$^{9,11}$]-3,6 and 2,5-dimethylundecane and various hardeners. The reactants were mixed in test tubes and the mixtures were heated at 80° C. for 1 hour, 120° C. for 2 hours and 160° C. for 6 hours. The pertinent data are given in the following Table IV.

TABLE IV

| Example | Diepoxide, Grams [1] | Hardner | Hardner, Grams | Resin Description |
|---|---|---|---|---|
| 47 | 0.9 | p,p'-Methylenedianiline. | 0.5 | Viscous liquid. |
| 48 | 0.9 | Diethylenetriamine | 0.2 | Do. |
| 49 | 0.9 | Phthalic anhydride | 1.1 | Solid. |
| 50 | 0.9 | Maleic anhydride | 0.5 | Do. |
| 51 | 0.9 | Adipic acid | 0.55 | Soft. |
| 52 | 0.9 | 1,2,6-hexanetriol and boron trifluoride-monoethylamine. | 0.2, 0.05 | Do. |
| 53 | 0.9 | Bisphenol A and 15 percent potassium Hydroxide in ethylene glycol. | 0.96, [2] 0.06 | Do. |
| 54 | 0.9 | Boron trifluoride-monoethylamine. | 0.05 | Do. |
| 55 | 0.9 | 4.5 percent sulfuric acid in ethylene glycol. | [3] 0.06 | Do. |
| 56 | 0.9 | 4.5 percent sulfuric acid in water. | [3] 0.04 | Do. |

[1] A mixture of 4,10-dioxatetracyclo[5.4.0.0$^{3,5}$.0$^{9,11}$]-3,6-dimethylundecane and 4,10-dioxatetracyclo[5.4.0.0$^{3,5}$.0$^{9,11}$]-2,5-dimethylundecane.
[2] As potassium hydroxide.
[3] As sulfuric acid.

Examples 57–66

The following examples illustrate the conditions for preparing resins from 4,10-dioxatetracyclo[5.4.0.0$^{3,5}$.0$^{9,11}$]-2 and 6-methoxyundecane and various hardeners. The reactants were mixed in test tubes and the mixtures were heated at 80° C. for 1 hour, 120° C. for 2 hours, and 160° C. for 6 hours. The pertinent data are given in the following Table V.

TABLE V

| Example | Diepoxide, Grams [1] | Hardner | Hardner, Grams | Resin Description |
|---|---|---|---|---|
| 57 | 0.85 | p,p'Methylene-dianiline. | 0.5 | Hard solid. |
| 58 | 0.85 | Diethylenetriamine [2] | 0.2 | Do. |
| 59 | 0.85 | Phthalic anhydride | 1.1 | Barcol, 15. |
| 60 | 0.85 | Maleic anhydride | 0.5 | Hard solid. |
| 61 | 0.85 | Adipic acid | 0.55 | Do. |
| 62 | 0.85 | 1,2,6-hexanetriol and boron trifluoride-monoethylamine. | 0.2, 0.05 | Do. |
| 63 | 0.85 | Bisphenol A and 15 percent potassium hydroxide in ethylene glycol. | 0.96, [3] 0.06 | Do. |
| 64 | 0.85 | Boron trifluoride-monoethylamine. | 0.05 | Barcol, 40. |
| 65 | 0.85 | 4.5 percent sulfuric acid in ethylene glycol. | [4] 0.06 | Hard solid. |
| 66 | 0.85 | 4.5 percent sulfuric acid in water. | 0.04 | Do. |

[1] A mixture of 4,10-dioxatetracyclo[5.4.0.0$^{3,5}$.0$^{9,11}$]-2-methoxyundecane and 4,10-dioxatetracyclo[5.4.0.0$^{3,5}$.0$^{9,11}$]-6-methoxyundecane.
[2] Gelled after 1 hour at 120° C.
[3] As potassium hydroxide.
[4] As sulfuric acid.

Examples 67–76

The following examples illustrate the conditions for preparing resins from 4,10-dioxatetracyclo[5.4.0.0$^{3,5}$.0$^{9,11}$]-2 and 6-acetoxyundecane, and various hardeners. The reactants were mixed in test tubes and the mixtures were heated 80° C. for 1 hour, 120° C. for 2 hours, and 160° C. for 6 hours. The pertinent data are given in the following Table VI.

TABLE VI

| Example | Diepoxide, Grams [1] | Hardner | Hardner, Grams | Resin Description |
|---|---|---|---|---|
| 67 | 0.85 | p,p'-Methylene-dianiline. | 0.25 | Hard solid. |
| 68 | 0.85 | Diethylenetriamine | 0.11 | Do. |
| 69 | 0.85 | Phthalic anhydride | 0.47 | Do. |
| 70 | 0.85 | Maleic anhydride | 0.25 | Barcol 45, strong. |
| 71 | 0.85 | Adipic acid | 0.37 | Hard solid. |
| 72 | 0.85 | 1,2,6-hexanetriol and boron trifluoride-monoethylamine. | 0.11, 0.04 | Do. |
| 73 | 0.85 | Bisphenol A and 15 percent potassium hydroxide in ethylene glycol. | 0.48, [2] 0.06 | Do. |
| 74 | 0.85 | Boron trifluoride-monoethylamine. | 0.04 | Do. |
| 75 | 0.85 | 4.5 percent sulfuric acid in ethylene glycol. | [3] 0.06 | Do. |
| 76 | 0.85 | 4.5 percent sulfuric acid in water. | 0.05 | Do. |

[1] A mixture of 4,10-dioxatetracyclo[5.4.0.0$^{3,5}$.0$^{9,11}$]-2-acetoxyundecane and 4,10-dioxatetracyclo[5.4.0.0$^{3,5}$.0$^{9,11}$]-6-acetoxyundecane.
[2] As potassium hydroxide.
[3] As sulfuric acid.

Example 77

A mixture is prepared from 4,10 - dioxatetracyclo [5.4.0.0$^{3,5}$.0$^{9,11}$]undecane and adipic acid in amounts so as to provide 1.0 carboxyl group per epoxy group. The resulting mixture is heated to 120° C. for a period of 10 minutes, and upon cooling to room temperature, i.e., approximately 25° C., a thermosetting product is obtained. The resulting product is dissolved in methyl isobutyl ketone at 100° C. and an iron panel or strip is dipped into the resulting solution. The iron panel subsequently is removed from this solution, is air dried for 15 minutes, and is baked at 160° C. for 2 hours. A thin coating is observed on that portion of the dipped iron panel. The resulting coating on the panel is glossy and tough. The coating displays excellent adhesion to the panel.

Example 78

A mixture is prepared from 4,10 - dioxatetracyclo [5.4.0.0$^{3,5}$.0$^{9,11}$]-2 and 6-methoxyundecane and phthalic anhydride in amounts so as to provide 1.0 carboxyl group per epoxy group. The resulting mixture is heated to 120° C. for a period of 5 minutes, and upon cooling to room temperature, i.e., approximately 25° C. a thermosetting product is obtained. The resulting product is dissolved in butyl acetate at 100° C., and an iron panel or strip is dipped into the resulting solution. The iron panel is removed almost immediately from this solution, is allowed to air dry for 15 minutes, and subsequently is baked at 160° C. for 15 minutes. A thin coating is observed on that portion of the dipped iron panel. The resulting coating on the panel is hard and tough. The coating displays excellent adhesion to the panel.

Example 79

The diepoxide, 4,10-dioxatetracyclo[5.4.0.0$^{3,5}$.0$^{9,11}$]-2 and 6-acetoxyundecane and dehydrated castor oil acid are admixed in amounts so as to provide 0.5 carboxyl group of said acid per epoxy group of said diepoxide. The resulting admixture then is heated for 2.0 hours at 180° C. to give a viscous product mixture which contained residual or free epoxy groups and hydroxyl groups. The viscous product mixture subsequently is charged to a round-bottomed flask which is fitted with an air stirrer, nitrogen purge line, thermometer, and dropping funnel. Sufficient xylene solvent is added to give a 90 weight percent solution and the temperature of the resulting admixture is brought to about 55° C. to 60° C. An amount of stannic chloride (0.3 weight percent based on the weight of said viscous product mixture) contained as a solution in ethyl acetate is then added dropwise to said admixture over a period of approximately 45 minutes. As the polymerization proceeds, sufficient xylene is added thereto to facilitate stirring. The solids content of the resulting solution is about 55 weight percent. To the resulting high molecular weight polymeric product mixture (varnish), a Parkerized steel panel is dipped therein. The resulting coated panel is air-dried for 30 minutes and is baked at 170° C. for 30 minutes. The coated panel resistance to boiling water (one hour) and caustic (20 percent NaOH for 20 minutes) is excellent.

*Example 80*

The diepoxide, 4,10 - dioxatetracyclo[5.4.0.0$^{3,5}$.0$^{9,11}$] undecane and soya bean oil acid are admixed in amounts so as to provide 0.4 carboxyl group of said acid per epoxy group of said diepoxide. The resulting admixture then is heated for 2.0 hours at 180° C. to give a viscous product mixture which contained residual or free epoxy groups and hydroxyl groups. This viscous product mixture subsequently is charged to a round-bottomed flask which is fitted with an air stirrer, nitrogen purge line, thermometer, and dropping funnel. Sufficient xylene solvent is added to give an 85 weight percent solution and the temperature of the resulting admixture is brought to about 50° C. to 60° C. An amount of boron trifluoride-diethyl ether complex (0.2 weight percent of boron trifluoride based on the weight of said viscous product mixture) contained in excess diethyl ether is then added dropwise to said admixture over a period of approximately 30 minutes. As the polymerization proceeds, sufficient xylene is added thereto to facilitate stirring. The solids content of the resulting solution of about 50 weight percent. To the resulting high molecular weight polymeric product mixture (varnish), a Parkerized steel panel is dipped therein. The resulting coated panel is air-dried for 20 minutes and is baked at 175° C. for 30 minutes. The coated panel resistance to boiling water (one hour) and caustic (20 percent NaOH for 20 minutes) is excellent.

*Example 81*

Ethylene glycol (45 grams), toluene (200 grams), and stannic chloride (2.0 grams) are charged to a reaction flask which is fitted with an air stirrer, thermometer, and dropping funnel. The resulting mixture is heated to about 100° C. and an amount of 4,10-dioxatetracyclo[5.4.0.0$^{3,5}$.0$^{9,11}$]undecane (sufficient to provide one epoxy group per hydroxyl group of said ethylene glycol) is added dropwise thereto over a period of 30 minutes. The reaction mixture subsequently is allowed to cool to about 75° C., and thereafter ice water is added to the reaction mixture, with stirring, to thus form a heterogeneous polymer-solvent water mixture. The liquid portion is decanted into a separating funnel and the remaining solid polymer phase is dissolved in cyclohexanone; the resulting solution is then added to the decanted material. The resulting mixture subsequently is shaken with additional water and is allowed to stand overnight, at room temperature after which time the polymer solution phase is recovered. The polymer solution phase is added to a two-liter flask to which are attached a distillation head, a vacuum pump, and a heating mantle. The solvents (cyclohexanone and toluene) are removed by heating at elevated temperatures and under reduced pressure. On cooling, there is obtained a polymeric polyhydric solid product. This product, dehydrated castor oil acid in an amount to cause essentially complete esterification, and xylene then are charged to a two-liter flask fitted with a stirrer, a nitrogen purge line, a thermometer, a distillation head, and a heating mantle. The mixture is heated to about 240° C. and is maintained thereat for approximately 2 hours during which period of time the water which is formed from esterification is removed at the stillhead as an azeotrope with xylene. The reaction mixture is allowed to cool to about 120° C., and sufficient xylene is added to afford a varnish solution containing about 75 weight percent non-volatiles.

To 100 parts by weight of the above said varnish solution, there is added 15 parts by weight of xylene. To this resulting solution, there is added 0.015 part by weight of cobalt naphthenate. Subsequently, a black iron panel is dipped in the varnish solution. The panel is removed almost immediately from said solution, is allowed to air dry for 30 minutes, and subsequently, is baked at 160° C. for 30 minutes. The resulting coating on the panel is glossy, tough, and resistant to cracking on continual bending (over 90 degree bends) of the panel. The coating displayed excellent adhesion and excellent resistance to caustic.

Although the invention has been illustrated by the preceding examples, the invention is not to be construed as limited to the materials employed in the above exemplary examples, but rather, the invention encompasses the generic area as hereinbefore disclosed. Various modifications and embodiments of this invention can be made without departing from the spirit and scope thereof.

What is claimed is:

1. Diepoxides having the general formula:

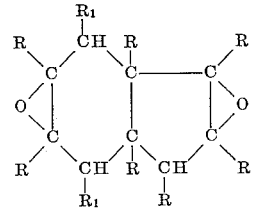

wherein R represents a member selected from a class consisting of hydrogen and alkyl radical of from 1 to 6 carbon atoms; and wherein $R_1$ represents a member selected from a class consisting of (*a*) hydrogen, (*b*) an alkyl radical of from 1 to 6 carbon atoms, (*c*) an alkoxy radical of from 1 to 6 carbon atoms, (*d*) an alkanoyloxy radical the alkyl portion of which contains from 1 to 6 carbon atoms, and (*e*) an alkoxycarbonyl radical the alkyl portion of which contains from 1 to 6 carbon atoms.

2. 4,10-dioxatetracyclo[5.4.0.0$^{3,5}$.0$^{9,11}$]alkyl-substituted undecane the alkyl group of which contains from 1 to 6 carbon atoms.

3. 4,10-dioxatetracyclo[5.4.0.0$^{3,5}$.0$^{9,11}$]alkoxyundecane the alkoxy group of which contains from 1 to 6 carbon atoms.

4. 4,10 - dioxatetracyclo[5.4.0.0$^{3,5}$.0$^{9,11}$]alkanoyloxyundecane the alkanoyloxy group of which contains from 1 to 6 carbons in the alkyl portion thereof.

5. 4,10-dioxatetracyclo[5.4.0.0$^{3,5}$.0$^{9,11}$]alkoxycarbonylundecane the alkoxycarbonyl group of which contains from 1 to 6 carbon atoms in the alkyl portion thereof.

6. 4,10-dioxatetracyclo[5.4.0.0$^{3,5}$.0$^{9,11}$]undecane.

7. 4,10-dioxatetracyclo[5.4.0.0$^{3,5}$.0$^{9,11}$] - 2 and 6-acetoxyundecane.

8. A cured, thermoset resin obtained by reacting a diepoxide of the formula:

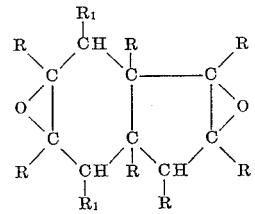

wherein R is of the group consisting of hydrogen and alkyl of from 1 to 6 carbon atoms; and wherein $R_1$ is of the group consisting of hydrogen and alkyl of from 1 to 6 carbon atoms, alkoxy of from 1 to 6 carbon atoms, alkanoyloxy of from 2 to 7 carbon atoms, and alkoxycarbonyl of from 2 to 7 carbon atoms; with a curing amount of an active organic hardener of the group consisting of (1) polycarboxylic acids, (2) polycarboxylic acid anhydrides, (3) polyhydric alcohols which have at least two hydroxyl groups, (4) polyhydric phenols which have at least two hydroxyl groups, and (5) polyfunctional amines which have at least two active amino hydrogen atoms; at a temperature in the range of from about 10° C. to about 250° C.

9. A cured, thermoset resin obtained by reacting, at a temperature of from about 10° C. to about 250° C., 4,10-dioxatetracyclo[5.4.0.0$^{3,5}$.0$^{9,11}$]undecane with a polycarboxylic acid in such relative amounts so as to provide from about 0.1 to about 2.0 carboxyl groups of said acid per epoxy group of said diepoxide.

10. A cured, thermoset resin obtained by reacting, at a temperature of from about 10° C. to about 250° C., 4,10-dioxatetracyclo[5.4.0.0$^{3,5}$.0$^{9,11}$]undecane with a polycarboxylic acid anhydride in such relative amounts so as to provide from about 0.1 to about 4.0 carboxyl groups of said anhydride per epoxy group of said diepoxide.

11. A cured, thermoset resin obtained by reacting, at a temperature of from about 10° C. to about 250° C., 4,10-dioxatetracyclo[5.4.0.0$^{3,5}$.0$^{9,11}$]undecane with a polyhydric alcohol which has at least two hydroxyl groups in such relative amounts so as to provide from about 0.1 to about 2.0 hydroxyl groups of said alcohol per epoxy group of said diepoxide.

12. A cured, thermoset resin obtained by reacting, at a temperature of from about 10° C. to about 250° C., 4,10-dioxatetracyclo[5.4.0.0$^{3,5}$.0$^{9,11}$]undecane with a polyhydric phenol which has at least two hydroxyl groups in such relative amounts so as to provide from about 0.1 to about 2.0 hydroxyl groups of said phenol per epoxy group of said diepoxide.

13. A cured, thermoset resin obtained by reacting, at a temperature of from about 10° C. to about 250° C., 4,10-dioxatetracyclo[5.4.0.0$^{3,5}$.0$^{9,11}$]undecane with a polyfunctional amine which has at least two active amino hydrogen atoms in such relative amounts so as to provide from about 0.2 to about 5.0 amino hydrogen atoms of said amine per epoxy group of said diepoxide.

References Cited by the Examiner

UNITED STATES PATENTS

| | | | |
|---|---|---|---|
| 2,752,403 | 6/1956 | Schutze et al. | 260—666 |
| 2,927,934 | 3/1960 | Greenspan et al. | 260—348.5 |
| 2,962,453 | 11/1960 | Phillips et al. | 260—2 |
| 2,977,374 | 3/1961 | Phillips et al. | 260—2 |

OTHER REFERENCES

Wadsworth et al., Ind. Eng. Chem., 45, pp. 217–221 (1953).

SAMUEL H. BLECH, *Primary Examiner.*

WILLIAM H. SHORT, IRVING MARCUS, *Examiners.*

G. K. MILESTONE, S. N. RICE, T. D. KERWIN,
*Assistant Examiners.*